(12) United States Patent
Strelow et al.

(10) Patent No.: US 9,530,235 B2
(45) Date of Patent: Dec. 27, 2016

(54) ALIGNING PANORAMIC IMAGERY AND AERIAL IMAGERY

(71) Applicant: Google Inc., Mountain View, CA (US)

(72) Inventors: Dennis Strelow, San Jose, CA (US); Craig Lewin Robinson, Palo Alto, CA (US); Samuel Felix de Sousa, Jr., Vienna (AT)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/546,217

(22) Filed: Nov. 18, 2014

(65) Prior Publication Data

US 2016/0140744 A1   May 19, 2016

(51) Int. Cl.
| | | |
|---|---|---|
| G06T 11/60 | (2006.01) | |
| G06T 3/00 | (2006.01) | |
| G06T 7/00 | (2006.01) | |

(52) U.S. Cl.
CPC ............. *G06T 11/60* (2013.01); *G06T 3/0068* (2013.01); *G06T 7/0024* (2013.01)

(58) Field of Classification Search
CPC ............ G06K 9/00637; G06K 9/00697; G06K 9/00704; G06K 9/32; G06T 11/60; G06T 11/00; G06T 15/205; G06T 17/05; G06T 2207/10032; G06T 2219/2016; G06T 3/00; G06T 3/4038; G06T 7/0028; G06T 7/0034
See application file for complete search history.

(56) References Cited

U.S. PATENT DOCUMENTS

| | | | |
|---|---|---|---|
| 6,597,818 B2 | 7/2003 | Kumar et al. | |
| 8,116,596 B2 | 2/2012 | McIntyre et al. | |
| 8,160,400 B2 | 4/2012 | Snavely et al. | |
| 8,761,457 B1 | 6/2014 | Seitz et al. | |
| 9,165,361 B1* | 10/2015 | Ely | G06T 3/00 |
| 2006/0132482 A1* | 6/2006 | Oh | G06T 13/80 |
| | | | 345/419 |
| 2007/0286490 A1 | 12/2007 | Danowitz | |
| 2009/0110267 A1* | 4/2009 | Zakhor | G06T 7/0046 |
| | | | 382/154 |

(Continued)

OTHER PUBLICATIONS

Annonymous, Google Earth 6 Released: Adds Seamless Street View, Nov. 29, 2010—2 pages.

(Continued)

*Primary Examiner* — Jingge Wu
(74) *Attorney, Agent, or Firm* — Dority & Manning, P.A.

(57) ABSTRACT

Systems and methods for aligning panoramic imagery of a geographic area captured from a perspective at or near ground level and aerial imagery captured from an oblique perspective are provided. More particularly, a facade plane can be detected in a panoramic image based at least in part on geometric data associated with the image. The panoramic image can also have an associated image pose. An aerial image depicting the same facade can then be identified. The aerial image can be associated with an image pose and geometric data of the depicted imagery. The panoramic image can be warped into an image having a perspective associated with the aerial image. One or more feature matches between the warped image and the aerial image can be identified using a feature matching technique. The matched features can be used to align the panoramic image with the aerial image.

17 Claims, 8 Drawing Sheets

(56) References Cited

U.S. PATENT DOCUMENTS

| | | | | |
|---|---|---|---|---|
| 2011/0286660 | A1* | 11/2011 | Ofek | G06K 9/00 382/154 |
| 2012/0300020 | A1* | 11/2012 | Arth | G06T 7/0046 348/36 |
| 2012/0314935 | A1* | 12/2012 | Cheng | G06K 9/00671 382/154 |
| 2013/0211790 | A1* | 8/2013 | Loveland | G06K 9/00637 703/1 |
| 2014/0064554 | A1 | 3/2014 | Coulter et al. | |
| 2014/0125667 | A1* | 5/2014 | Praun | G06K 9/00637 345/423 |
| 2014/0301645 | A1* | 10/2014 | Mattila | G06K 9/00671 382/182 |
| 2014/0347475 | A1* | 11/2014 | Divakaran | G06K 9/0071 348/135 |
| 2015/0371440 | A1* | 12/2015 | Pirchheim | G06T 17/05 345/419 |

OTHER PUBLICATIONS

Bansal et al., "Geo-Localization of Street Views with Aerial Image Databases," 2011 ACM Multimedia Conference & Co-Located Workshops, Scottsdale, Arizona, Nov. 28, 2011, pp. 1125-1128.

PCT International Search Report for corresponding PCT Application No. PCT/US2015/051466, mailed on Jan. 20, 2016—6 pages.

Boix et al., "Sparse Quantization for Patch Description", IEEE Conference on Computer Vision and Pattern Recognition, Portland, Oregon, Jun. 23-28, 2013, pp. 2842-2849.

Braux-Zin et al., "A General Dense Image Matching Framework Combining Direct and Feature-Based Costs", IEEE International Conference on Computer Vision, Sydney, Australia, Dec. 1-8, 2013, pp. 185-192.

Cheng et al., "Fast and Accurate Image Matching with Cascade Hashing for 3D Reconstruction", Computer Vision Foundation, Columbus, Ohio, Jun. 24-27, 2014, 8 pages.

Eshet et al., "DCSH—Matching Patches in RGBD Images", IEEE International Conference on Computer Vision, Sydney, Australia, Dec. 1-8, 2013, pp. 89-96.

Guo et al., "An Adaptive Descriptor Design for Object Recognition in the Wild", IEEE International Conference on Computer Vision, Sydney, Australia, Dec. 1-8, 2013, pp. 2568-2575.

Hartmann et al., "Predicting Matchability", IEEE Conference on Computer Vision and Pattern Recognition, Columbus, Ohio, Jun. 24-27, 2014, pp. 9-16.

Hu et al., "Graph Matching with Anchor Nodes: A Learning Approach", IEEE Conference on Computer Vision and Pattern Recognition, Columbus, Ohio, Jun. 23-28, 2013, pp. 2906-2913.

Isack et al., "Energy Based Multi-Model Fitting & Matching for 3D Reconstruction", IEEE Conference on Computer Vision and Pattern Recognition, Columbus, Ohio, Jun. 23-28, 2014, pp. 1146-1153.

Jia et al., "Heavy-Tailed Distances for Gradient Based Image Descriptors", Advances in Neural Information Processing Systems, UC Berkeley, Dec. 14, 2011, 9 pages.

Kaminsky et al., "Alignment of 3D Point Clouds to Overhead Images", IEEE Computer Society Conference on Computer vision and Pattern Recognition Workshops, Miami, Florida, Jun. 20-25, 2009, pp. 63-70.

Lee et al., "Automatic Pose Estimation of Complex 3D Building Models", Proceedings of the Sixth IEEE Workshop on Applications of Computer Vision, Orlando, Florida, Dec. 3-4, 2002, pp. 148-152.

Lin et al., "Robust Non-Parametric Data Fitting for Correspondence Modeling", IEEE International Conference on Computer Vision, Sydney, Australia, Dec. 1-8, 2013, pp. 2376-2383.

Liu et al., "Automatic Kronecker Product Model Based Detection of Repeated Patterns in 2D Urban Images", IEEE International Conference on Computer Vision, Sydney, Australia, Dec. 1-8, 2013, pp. 401-408.

Liu et al., A Systematic Approach for 2D-Image to 3D-Range Registration in Urban Environments, Computer Vision and Image Understanding, vol. 116, 2012, pp. 25-37.

Middelberg et al., "Scalable 6-DOF Localization on Mobile Devices", 13th European Conference on Computer Vision, Zurich, Switzerland, Sep. 6-12, 2014, pp. 268-283.

Mori et al., "View Generation with 3D Warping Using Depth Information for FTV", Signal Processing: Image Communication, vol. 24, Issue 1-2, Jan. 2009, pp. 65-72.

Pritts et al., "Detection, Rectification and Segmentation of Coplanar Repeated Patterns", IEEE Conference on Computer Vision and Pattern Recognition, Columbus, Ohio, Jun. 23-28, 2014, pp. 2973-2980.

Sattler et al., "Fast Image-Based Localization Using Direct 2D-to-3D Matching", 13th IEEE International Conference on Computer Vision, Barcelona, Spain, Nov. 6-13, 2011, pp. 667-674.

Sattler et al., "Image Retrieval for Image-Based Localization Revisited", British Machine Vision Conference, Guildford, United Kingdom, Sep. 3-7, 2012, pp. 76.1-76.12.

Sattler et al., "Improving Image-Based Localization by Active Correspondence Search", 12th European Conference on Computer Vision, Firenze, Italy, vol. 7572, 2012, pp. 752-765.

Sattler et al., "SCRAMSAC: Improving RANSAC's Efficiency with a Spatial Consistency Filter", 12th IEEE International Conference on Computer Vision, Kyoto, Japan, Sep. 29-Oct. 2, 2009, pp. 2090-2097.

Sattler et al., "Towards Fast Image-Based Localization on a City-Scale", Outdoor and Large-Scale Real-World Scene Analysis, 15th International Workshop on Theoretical Foundations of Computer Vision, vol. 7474, Dagstuhl Castle, Germany, Jun. 26-Jul. 1, 2011, pp. 191-211.

Shotton et al., "Scene Coordinate Regression Forests for Camera Relocalization in RGB-D Images", IEEE International Conference on Computer Vision and Pattern Recognition, Portland, Oregon, Jun. 23-28, 2013, pp. 2930-2937.

Sibbing et al., "SIFT—Realistic Rendering", Proceedings of Three-Dimensional Vision, Seattle, Washington, Jun. 29-30, 2013, pp. 56-63.

Snavely et al., "Modeling the World from Internet Photo Collections", International Journal of Computer Vision, vol. 80, Issue 2, Nov. 2008, pp. 189-210.

Taneja et al., "Registration of Spherical Panoramic Images with Cadastral 3D Models", International Conference on 3D Imaging, Modeling, Processing, Visualization and Transmission, Zurich Switzerland, Oct. 13-15, 2012, pp. 479-486.

Tolias et al., "To Aggregate or Not to Aggregate: Selective Match Kernels for Image Search", 13th European Conference on Computer Vision, Zurich, Switzerland, Sep. 6-12, 2014, pp. 1401-1408.

Torresani et al., "Feature Correspondence via Graph Matching: Models and Global Optimization", 10th European Conference on Computer Vision, vol. 5303, Marseille, France, Oct. 12-18, 2008, pp. 596-609.

Trzcinski et al., "Boosting Binary Keypoint Descriptors", IEEE International Conference on Computer Vision and Pattern Recognition, Portland, Oregon, Jun. 23-28, 2013, pp. 2874-2881.

Trzcinski et al., "Learning Image Descriptors with the Boosting-Trick", Advances in Neural Information Processing Systems, Lake Tahoe, Nevada, Dec. 3-8, 2012, pp. 269-277.

Umeyama, "Least-Squares Estimation of Transformation Parameters Between Two Point Patterns", IEEE Transactions on Pattern Analysis and Machine Intelligence, vol. 13, No. 4, Apr. 1991, pp. 376-380.

Untzelmann et al., "A Scalable Collaborative Online System for City Reconstruction", IEEE International Conference on Computer Vision Workshops, Sydney, Australia, Dec. 2-8, 2013, pp. 644-651.

Wang et al., "Wide-Baseline Image Matching Using Line Signatures", 12th IEEE International Conferance on Computer Vision, Kyoto, Japan, Sep. 29-Oct. 2, 2009, pp. 1311-1318.

Weinzaepfel et al., "DeepFlow: Large Displacement Optical Flow with Deep Matching", IEEE International Conference on Computer Vision, Sydney, Australia, Dec. 1-8, 2013, pp. 1385-1392.

(56) References Cited

OTHER PUBLICATIONS

Wu et al., 3D Model Matching with Viewpoint-Invariant Patches (VIP), IEEE Conference on Computer Vision and Pattern Recognition, Anchorage, Alaska, Jun. 23-28, 2008, pp. 1-8.
Zeisl et al., "Automatic Registration of RGB-D Scans via Salient Directions", IEEE International Conference on Computer Vision, Sydney, Australia, Dec. 108, 2013, pp. 2808-2815.
Bansal et al., "Ultra-wide baseline facade matching for geo-localization." In European Conference on Computer Vision, Springer Berlin Heidelberg, Oct. 7, 2012, pp. 175-186.
Tonge et al., "Parsing World's Skylines Using Shape-Constrained MRFs." in Proceedings of the IEEE Conference on Computer Vision and Pattern Recognition 2014, pp. 3174-3181.
Torii et al., "Visual place recognition with repetitive structures." In Proceedings of the IEEE Conference on Computer Vision and Pattern Recognition 2013, pp. 883-890.

\* cited by examiner

ALIGNING PANORAMIC IMAGERY AND AERIAL IMAGERY

FIELD

The present disclosure relates generally to image processing, and more particularly to aligning panoramic imagery and aerial imagery.

BACKGROUND

Panoramic imagery of a geographic area can be captured by mobile data acquisition units from a perspective at or near ground level. This imagery can be a valuable resource for refining representations of a geographic area provided, for instance, by a geographic information system, such as a mapping service or a virtual globe. For example, panoramic imagery can be used to refine or generate high resolution three-dimensional models of various landmarks, buildings, objects, terrain, etc. in a geographic information system. The panoramic imagery can also be used to provide interactive three-dimensional imagery of a geographic area from a street or ground level. The panoramic imagery can have associated camera parameters, such as an image pose, and geometry information regarding the geographic area depicted in the imagery.

Panoramic imagery can be stored in a geographic information system database. Geographic information system databases can also store aerial imagery of a geographic area. The aerial imagery can be captured, for instance, from an aircraft and can provide, for instance, an oblique perspective of the geographic area from one of various canonical viewpoints, such as north, south, east, and west canonical viewpoints. The database of aerial imagery can be associated with pose information. Additionally, the database of aerial imagery can have an associated three-dimensional geometry of the subject matter depicted in the imagery.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of aligning panoramic imagery with to aerial imagery. The method includes accessing, by one or more computing devices, a panoramic image captured from a perspective at or near ground level. The panoramic image can be associated with a first pose and first geometric data. The method further includes detecting, by the one or more computing devices, a facade plane in the panoramic image based at least in part on the first geometric data. The method further includes identifying, by the one or more computing devices, an aerial image based at least in part on the detected facade plane. The aerial image depicts the facade plane and is associated with a second pose and second geometric data. The method further includes transforming, by the one or more computing devices, the panoramic image to a warped image by projecting an image plane of the panoramic image to an image plane associated with the aerial image based at least in part on the first geometric data. The method further includes identifying, by the one or more computing devices, one or more feature matches between the warped image and the aerial image, and aligning, by the one or more computing devices, the panoramic image to the aerial image based at least in part on the one or more feature matches.

Other aspects of the present disclosure are directed to systems, apparatus, tangible, non-transitory computer-readable media, user interfaces and devices for aligning panoramic imagery and aerial imagery.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
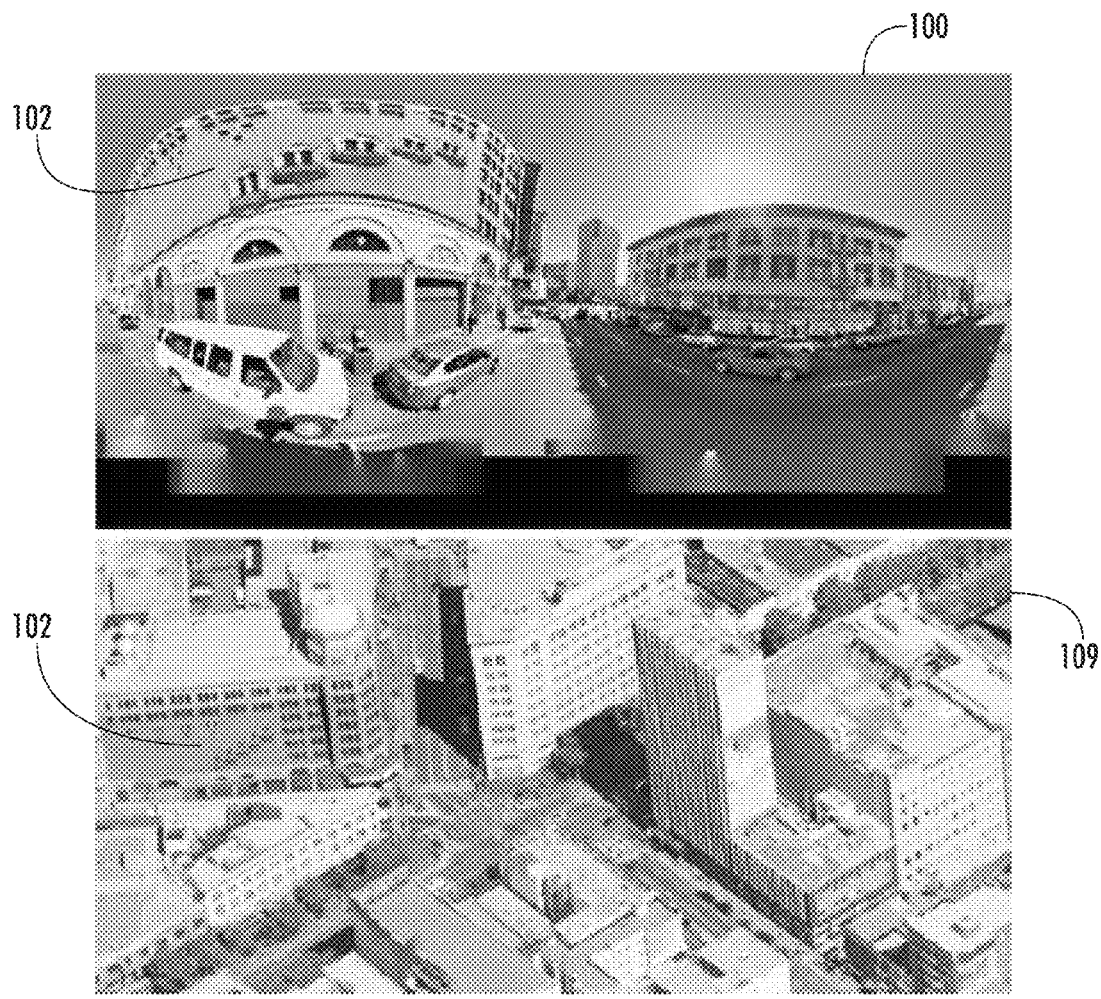
FIG. 1 provides an example panoramic image depicting a building facade and an example aerial image depicting the same facade.

Reference will now be made in detail to embodiments, one or more examples of which are illustrated in the drawings. Each example is provided by way of explanation of the embodiments, not limitation of the invention. In fact, it will be apparent to those skilled in the art that various modifications and variations can be made to the embodiments without departing from the scope or spirit of the present disclosure. For instance, features illustrated or described as part of one embodiment can be used with another embodi-

Overview

Example aspects of the present disclosure are directed to aligning panoramic imagery captured from a perspective at or near ground level with aerial imagery captured from, for instance, an oblique perspective. As used herein, panoramic imagery can include an image providing a panoramic view (e.g. a wide angle view) of a geographic area and/or one or more images (e.g. unstitched images) used in generating images providing a panoramic view of a geographic area. Aligning a panoramic image to an aerial image can be difficult because the images often possess drastically different viewpoints. This can cause differences in the depictions in the images. For instance, even though a panoramic image and an aerial image may both depict the same building facade, the view of the facade as depicted in the aerial image can be foreshortened, occluded or otherwise blurry when compared with the view of the facade as depicted in the panoramic image. Another difficulty in aligning a panoramic image to an aerial image arises when the images are captured at different times. The images can be captured, for instance, at different times of a day or at different times of a year. This can cause the images to have different shadings and colors. Additionally the geography itself can change in between the times the images are captured, causing the images to depict different geographies. For instance, a building facade can be remodeled after a first image is captured but before a second image is captured, causing the images to depict different variations of the same facade.

In light of the unique challenges described above, the disclosed embodiments provide features for efficient and accurate alignment of panoramic imagery and aerial imagery. Specific algorithms are implemented to utilize camera parameters and geometric data associated with both panoramic images and aerial images in an effort to match the images. Improved three-dimensional models resulting from the implementation of the disclosed features and algorithms are useful for general reference and analysis of urban scenes. More particularly, accurate and efficient matching of panoramic and aerial images can provide for more accurate alignment of the images. Accurate alignment of these images can, for instance, help to better populate geographic information systems such as, for instance, mapping services or virtual globes.

According to example aspects of the present disclosure, images associated with a first perspective and images associated with a second perspective are aligned. For instance, panoramic imagery captured from a perspective at or near ground level can be aligned with aerial imagery. In one particular example, a panoramic image captured from a perspective at or near ground level can be accessed for alignment with aerial imagery. The panoramic image can be associated with a pose. As used herein, the pose of an image refers to the position and/or orientation of a camera as it captures an image, relative to a reference. The panoramic image can also be associated with a three-dimensional geometry of the imagery depicted in the panoramic image. The three-dimensional geometry can be determined, for instance, by data collected by a laser range finder, such as LIDAR data. The three-dimensional geometry can also be determined, for instance, by structure-from-motion techniques.

Once the panoramic image has been accessed, a facade plane can be detected in the panoramic image. The facade plane can be detected based at least in part on the three-dimensional geometry of the imagery depicted in the image. An aerial image can then be identified based at least in part on the detected facade plane. The aerial image can depict the same building facade as the panoramic image, and can be captured, for instance, from an oblique perspective. The identified aerial image can be the aerial image with the least foreshortened, least occluded view of the building facade depicted in the panoramic image. The aerial image can have an associated camera pose. The aerial image can also be associated with a three-dimensional geometry of the imagery depicted in the aerial image, such as the city or town where the building facade is located. The three-dimensional geometry can include, for instance, a stereo-based depth map.

Once the panoramic image has been accessed and the aerial image has been identified, the panoramic image can be transformed into a warped image having a perspective associated with the aerial image. For instance, the panoramic image can be warped to the aerial image by using the aerial image's pose, the panoramic image's pose and the detected facade plane position to project an image plane of the panoramic image to an image plane associated with the aerial image.

One or more feature matches between the warped image and the aerial image can then be identified using a feature matching technique. The feature matching technique can, for instance, be comprised of extracting one or more descriptors of the warped image and the aerial image, and matching the corresponding descriptors in the warped image and the aerial image. The matched features can then be used to find a geometric transformation relating the warped image and the aerial image.

Once the geometric transformation is found, the panoramic image can be aligned to the aerial image based on the geometric transformation. The alignment can be performed, for instance, by creating constraints that relate three-dimensional facade points associated with the detected facade plane and their two dimensional locations in the panoramic image. As another example, the alignment can be performed by creating constraints that relate two dimensional locations in the panoramic and aerial images. Alignment can be enhanced by adjusting the pose associated with the panoramic image using the one or more feature matches. For instance, a bundle adjustment algorithm can be used to adjust the pose of the panoramic image and to georeference objects depicted in the panoramic image based at least in part on the matched features between the warped image and the aerial image.

Once the panoramic image and the aerial image have been aligned, a three-dimensional model of the geographic area depicted in the images can be updated based at least in part on the alignment of the images. The updated three-dimensional model can then be stored in, for instance, a geographic information system, where it can be requested by and transmitted to a user of, for instance, a mobile computing device.

Various implementations of the present disclosure can include, for instance, excluding the extraction of descriptors on pixels associated with vegetation from the disclosed feature matching technique. Further implementations can include excluding the extraction of descriptors on any pixels not associated with the facade plane.

Another implementation of the present disclosure can exclude the extraction of descriptors on pixel areas of the warped image that possess large amounts of blurring. Large swaths of blurred pixels in an image can cause that area to be unrecognizable, which creates difficulties in feature matching. In an alternative embodiment, blurring can be reduced by transforming an unstitched image of a facade plane, rather than a full panoramic image, into a warped image. Warped images resulting from unstitched images can have less blurring than corresponding warped images resulting from full panoramic images.

According to an example embodiment, a mobile data acquisition unit provided on a transportation device acquires street level panoramic imagery. The mobile data acquisition unit further acquires three-dimensional geometry data associated with the panoramic imagery. A particular street level panoramic image is accessed, along with the image pose and the three-dimensional geometry data associated with the image. Based on the geometry data, a facade plane is detected in street level image. Once a facade plane has been detected, an aerial image depicting the same facade plane is identified. The identified aerial image has the least foreshortened and least occluded view of the detected facade plane. The panoramic image is then transformed into a warped image by projecting an image plane of the panoramic image to an image plane associated with the aerial image. Feature matches between the warped image and the aerial image are then identified using a feature matching technique. Once the feature matches have been identified, the panoramic image can be aligned to the aerial image. The images are aligned by creating constraints that relate three-dimensional facade points associated with the facade plane and their two dimensional locations in the panoramic image. Alternatively, the images can be aligned by creating constraints that relate two dimensional locations in the panoramic image and the aerial image.

Example Panoramic Imagery and Aerial Imagery

FIG. 1 depicts an example panoramic image 100 depicting a building facade 102 and an example aerial image 104 depicting the same facade 102. Panoramic image 100 is captured from a perspective at or near ground level. Panoramic image 100 can be an image captured from a mobile data acquisition unit provided on a transportation device. Panoramic image 100 can have an associated camera pose and an associated geometric data. The geometric data can be a three-dimensional geometry determined, for instance, by data collected by a laser range finder, such as LIDAR data. Panoramic image 100 can be accurately georeferenced and stored, for instance in a geographic information system. More particularly, panoramic image 100 can be stored and indexed according to geographic position captured by a positioning system located on a transportation device. In addition, panoramic image 100 can be texture mapped to a surface, such as a sphere or cylinder.

Aerial image 104 depicts facade 102 from a different viewpoint. More particularly, aerial image 104 depicts facade 102 from an oblique perspective relative to facade 102. Aerial image 104 can be captured by an image capture device mounted on an aircraft such as, for instance, a helicopter or airplane. Aerial image 104 can also have a camera pose and associated geometric data. The associated geometric data can, for instance, be a three-dimensional geometry of the geographic area depicted in aerial image 104. The three-dimensional geometry can be depicted in a stereo-based depth map of the geographic area depicted in the aerial image. The aerial image can be georeferenced and stored, for instance, in a geographic information system.

More particularly, a geographic information system can include aerial imagery of a geographic area captured along various canonical viewpoints of the geographic area, such as along the north, south, east and west directions. The aerial imagery can be stored and indexed according to geographic coordinates. The aerial imagery can be used to provide an interactive representation of the geographic area from an oblique perspective to a user of the geographic information system.

Figure 2:
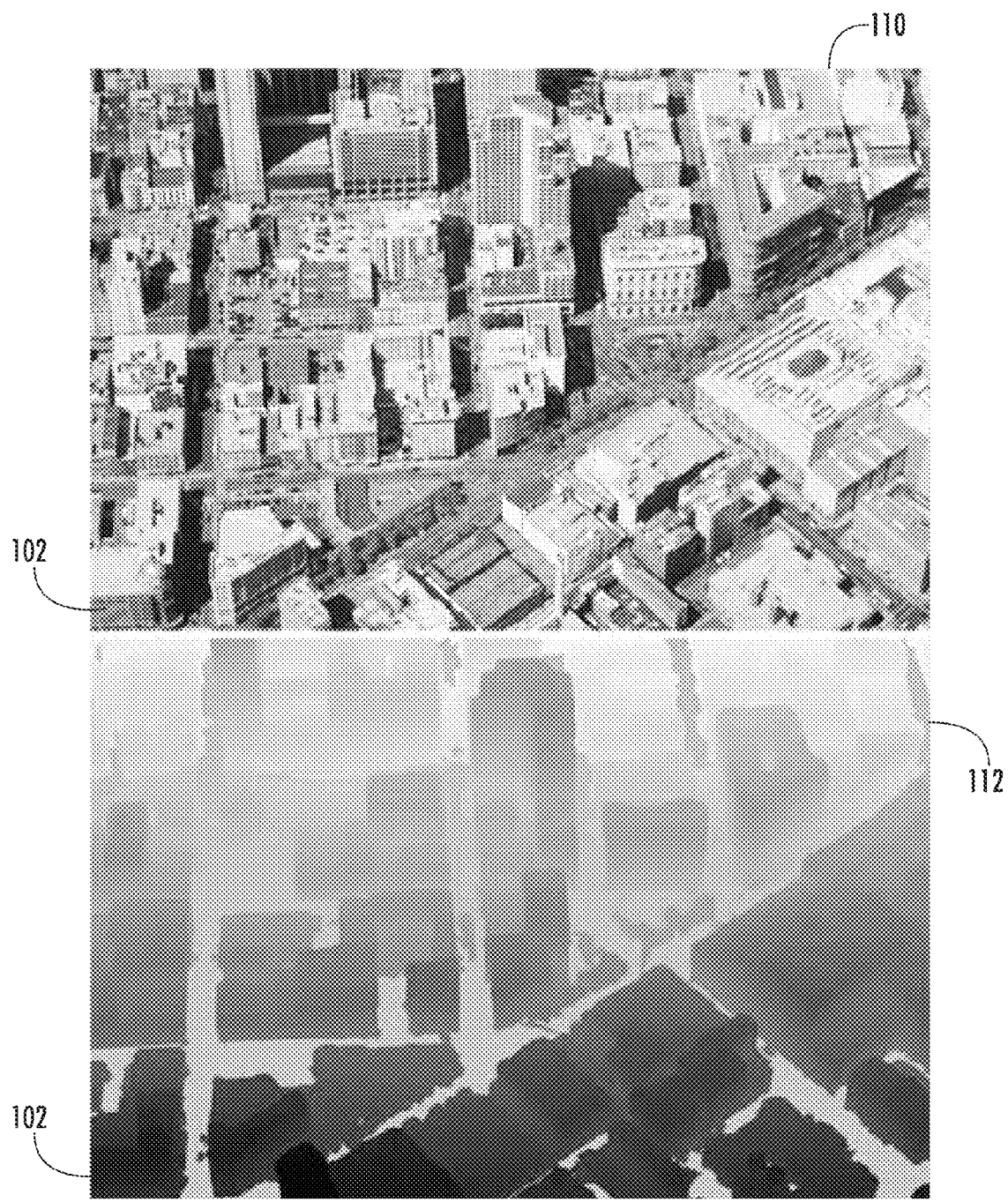
FIG. 2 provides an example aerial image and a stereo-based three-dimensional depth map associated with the aerial image.

FIG. 2 depicts aerial image 110 depicting facade 102 and the surrounding geographic area. Aerial image 110 is captured from an oblique perspective relative to facade 102 and has a different viewpoint than panoramic image 100 and aerial image 104. FIG. 2 further depicts depth map 112. Aerial image 110 can be captured, for instance, by a stereo camera and depth map 112 can be generated using stereo matching techniques. Other techniques can be used to generate depth map 112 without deviating from the scope of the present disclosure. For instance, structure-from-motion techniques can be used to generate depth map 112.

Depth map 112 depicts the three-dimensional geometry of the geographic area depicted in aerial image 110, including that of facade 102. The three-dimensional geometry generated by depth map 112 can be associated with aerial image 110 and stored, for instance, in a geographic information system, as described above.

Figure 3:
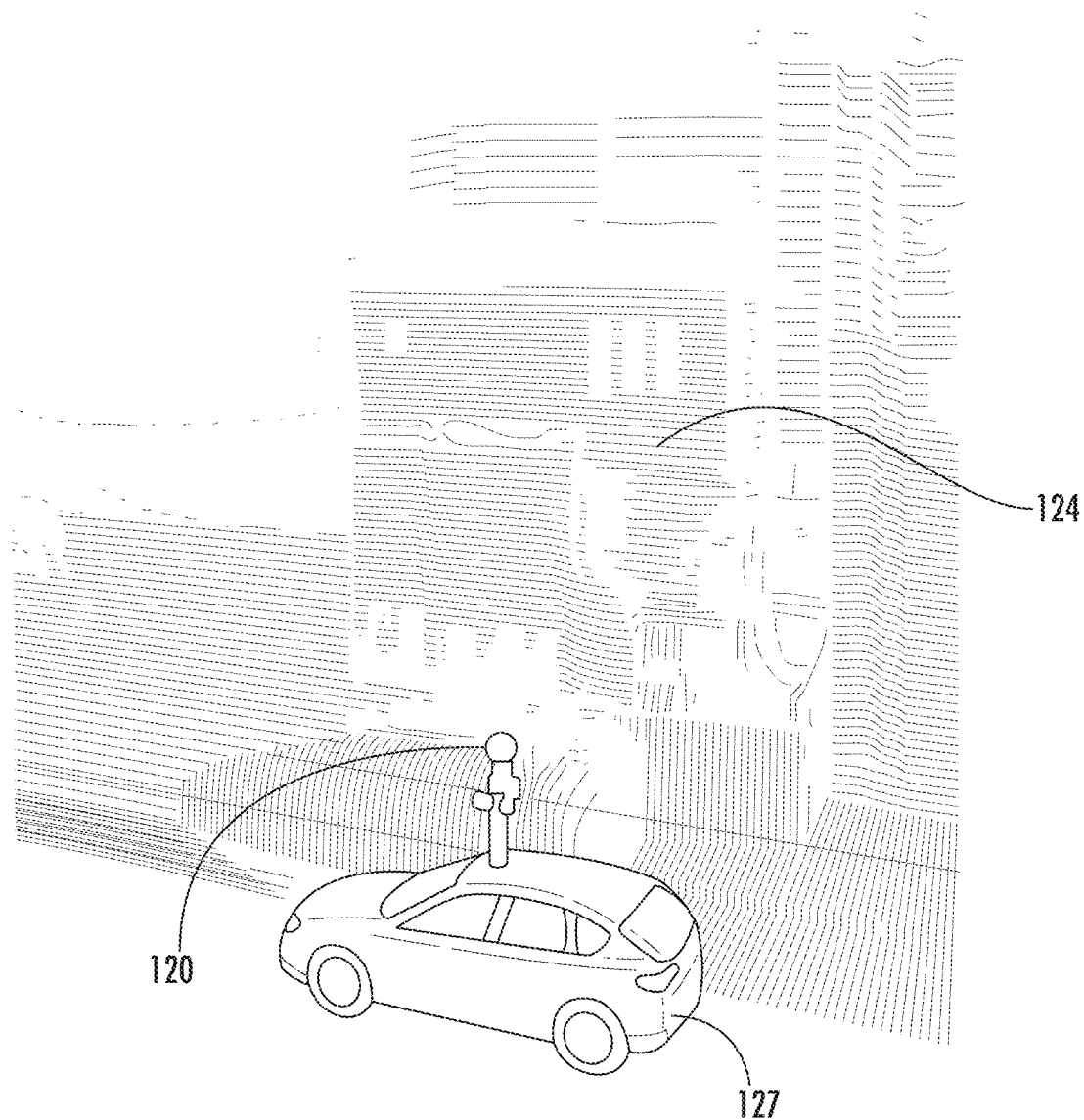
FIG. 3 depicts an example mobile acquisition unit for capturing panoramic imagery.

FIG. 3 depicts a mobile data acquisition unit 120 provided on a transportation device 127. Mobile data acquisition unit 120 can include a combination of sensors or data acquisition devices such as, but not limited to, cameras capable of acquiring two dimensional (2D) photos or videos, and laser scanners capable of acquiring terrestrial LIDAR data. The combination of sensors and data acquisition devices can be used to create a three-dimensional point cloud, which can be used to generate a three-dimensional geometry of building facade 124. Transportation device 127 can include a combination of sensors or other devices such as, but not limited to, a positioning system (e.g. a GPS system, or other positioning system), an accelerometer, a gyroscope, and a wheel speed sensor. The combination of sensors can be used to determine positional information of mobile data acquisition unit 120.

Example Methods for Aligning Panoramic Imagery with Aerial Imagery

Figure 4:
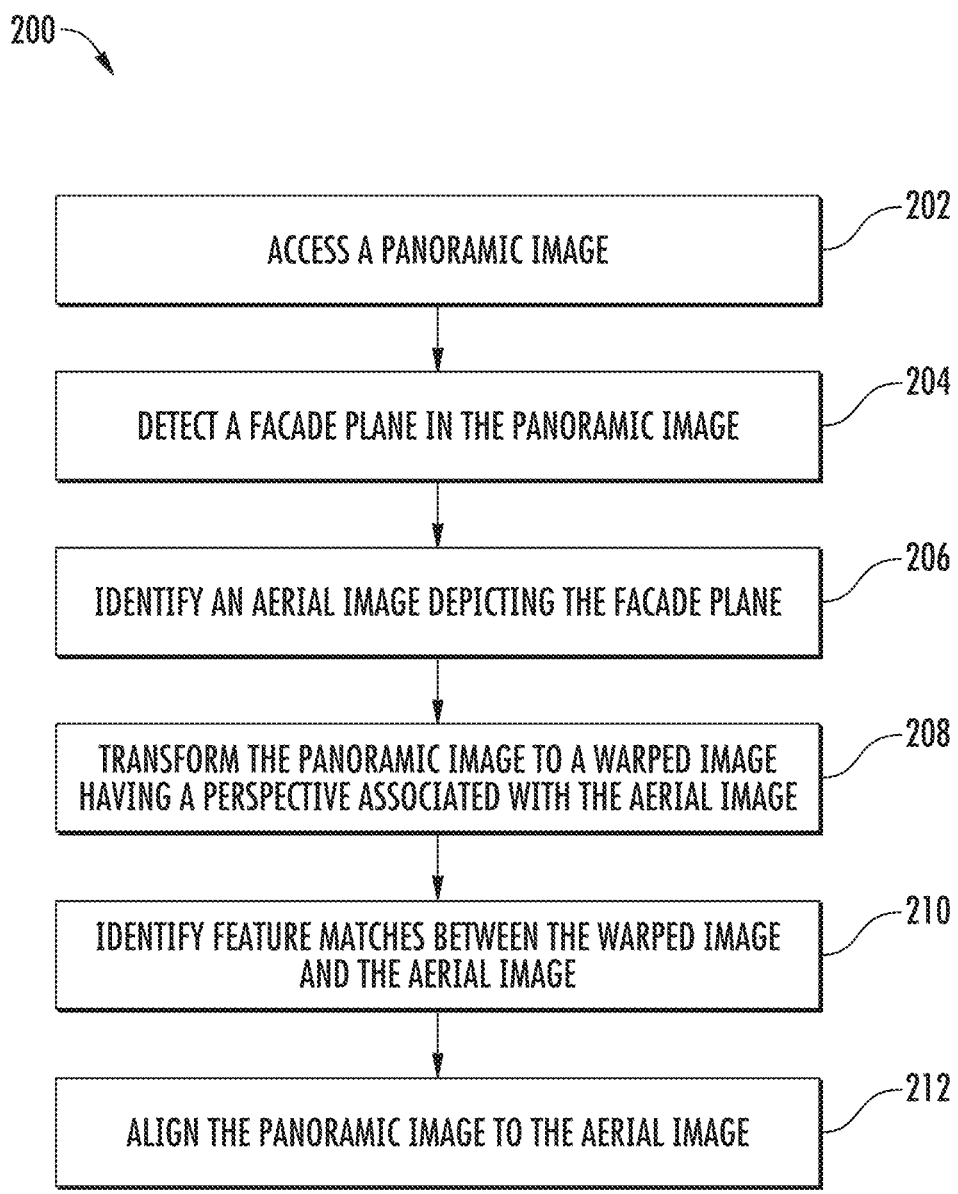
FIG. 4 depicts a flow diagram of an example method for aligning features between a warped image and an aerial image according to example embodiments of the present disclosure

FIG. 4 depicts a flow diagram of an example method (200) for aligning a panoramic image and an aerial image. Method (200) can be implemented by one or more computing devices, such as one or more of the computing devices depicted in FIG. 10. In addition, FIG. 4 depicts steps performed in a particular order for purposes of illustration and discussion. Those of ordinary skill in the art, using the disclosures provided herein, will understand that the various steps of any of the methods disclosed herein can be omitted, adapted, modified, rearranged, or expanded in various ways without deviating from the scope of the present disclosure.

At (202), method (200) can include accessing a panoramic image for alignment with aerial imagery. The panoramic image can depict, for instance a building facade. The panoramic image can have an associated pose and an associated geometric data. The pose can be determined by a combination of sensors and other devices located on a transportation device, such as, but not limited to, a GPS unit, an accelerometer, and a gyroscope. The associated geometric data can be a three-dimensional geometry of the imagery depicted in the panoramic image.

At (204), method (200) can include detecting a facade plane in the panoramic image. The facade plane can be detected based at least in part on the three-dimensional geometry of the imagery depicted in the panoramic image. More particularly, the facade plane can be detected by using the three-dimensional geometry to identify vertical planar polygons that correspond to the building facade depicted in the panoramic image.

Figure 5:
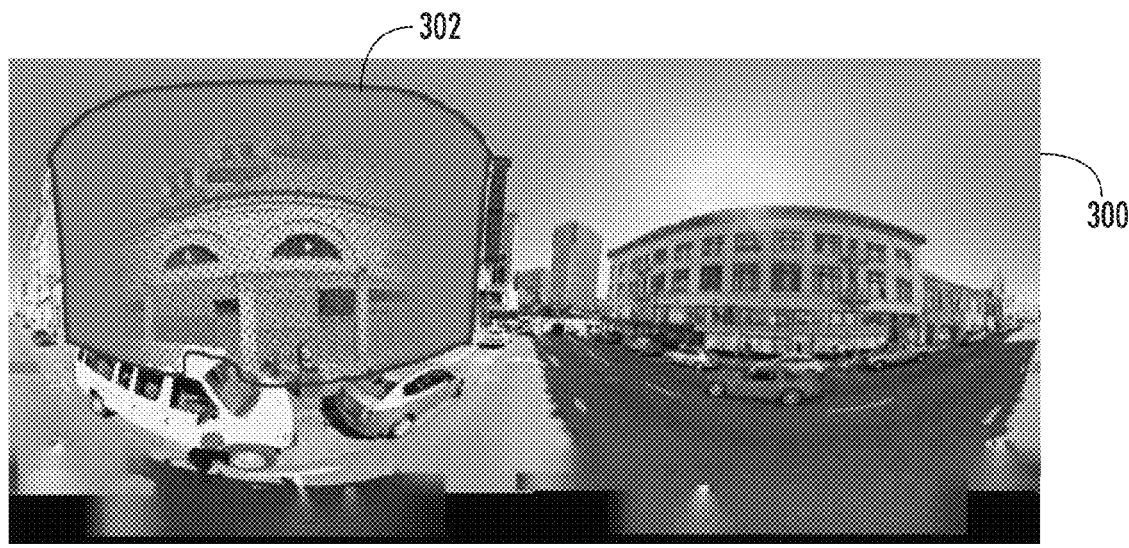
FIG. 5 depicts an example detected facade plane according to example embodiments of the present disclosure.

FIG. 5 depicts an example detected facade plane 302 in a panoramic image 300 captured from a perspective at or near ground level according to an example embodiment of the present disclosure. Facade plane 302 is detected based on the three-dimensional geometry associated with panoramic image 300. For instance, facade plane 302 can be detected by using the three-dimensional geometry to identify vertical planar polygons that correspond to a building facade. Detected polygons that are too small, non-vertical, or otherwise unsuitable can be filtered out to better facilitate detection of facade plane 302.

Referring back to FIG. 4, at (206), method (200) can include identifying an aerial image. The aerial image can be identified based at least in part on the detected facade plane of (204). For instance, a panoramic image can be accessed for alignment with aerial imagery. The location of the geographic area depicted in the panoramic image can be determined based at least in part on the panoramic image's associated pose and geometric data. A set of candidate aerial images that depict the same geographic area can be obtained from the geographic information system for alignment with the panoramic image. The obtained candidate aerial images can be selected based on their respective poses and geometric data. More particularly, a pose and geometric data associated with an aerial image can be utilized to determine if the aerial image depicts the same geographic area as the panoramic image.

From the set of candidate aerial images, the aerial image with the least foreshortened and least occluded view of the building facade depicted in the panoramic image can be identified for alignment with the panoramic image. In an alternative embodiment, the aerial image with the least foreshortened, least occluded view of the particular area of the building facade that is recognizable in the panoramic image can be identified for alignment with the panoramic image. In still another alternative embodiment, the aerial image can be identified based at least in part on similarity to the view direction of the panoramic image. Identifying an aerial image based on view direction can facilitate image similarity in the azimuth direction, which can lead to more efficient and accurate feature matching.

At (208), method (200) can include transforming the panoramic image into a warped image having a perspective associated with the aerial image. For instance, the panoramic image can be warped to a perspective associated with the aerial image by using the aerial image's pose, the panoramic image's pose, and the position of the detected facade plane to project the facade plane to an image plane associated with the aerial image.

Figure 6:
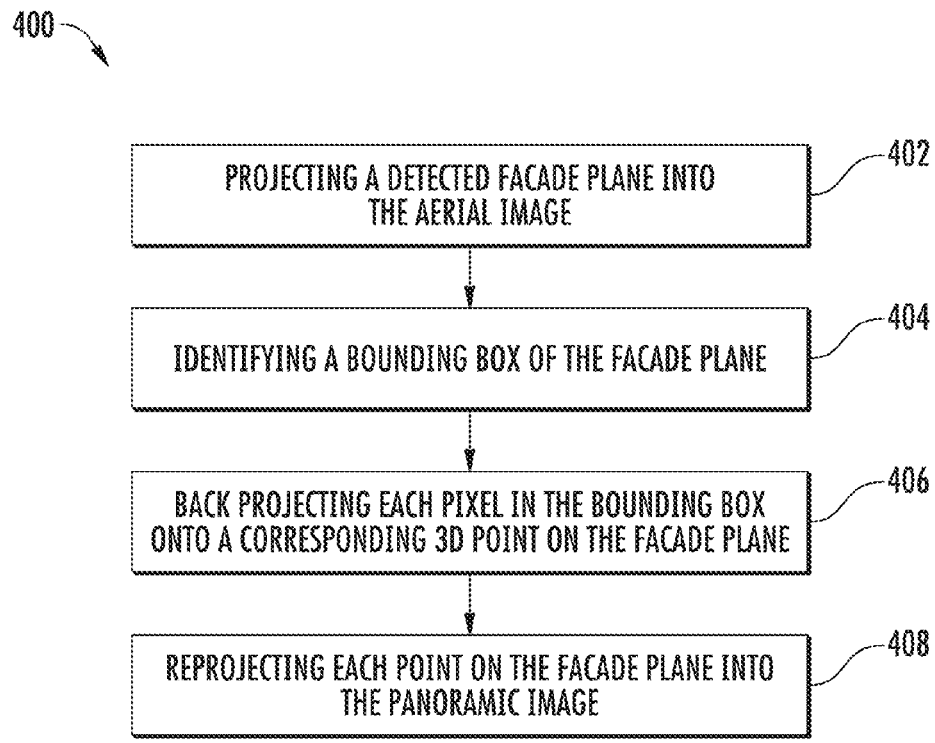
FIG. 6 depicts a flow diagram of an example method for transforming a panoramic image into a warped image according to example embodiments of the present disclosure.

FIG. 6 depicts a flow chart of an example method (400) for transforming a panoramic image into a warped image according to an example embodiment of the present disclosure. At (402), method (400) can include projecting a detected facade plane into an aerial image. The detected facade plane can correspond to a building facade depicted in a panoramic image. At (404) method (400) can include identifying a bounding box of the facade plane relative to the aerial image. At (406), method (400) can include back projecting each pixel in the bounding box onto a corresponding three-dimensional point on the detected facade plane. At (408), method (400) can include reprojecting each three-dimensional point on the facade plane into a corresponding point in the panoramic image. The color for each pixel in the warped image can be based, for instance, on the RGB value for each corresponding point in the panoramic image. Other techniques for transforming a panoramic image into a warped image having a perspective associated with an aerial image can be used without deviating from the scope of the present disclosure.

Figure 7:
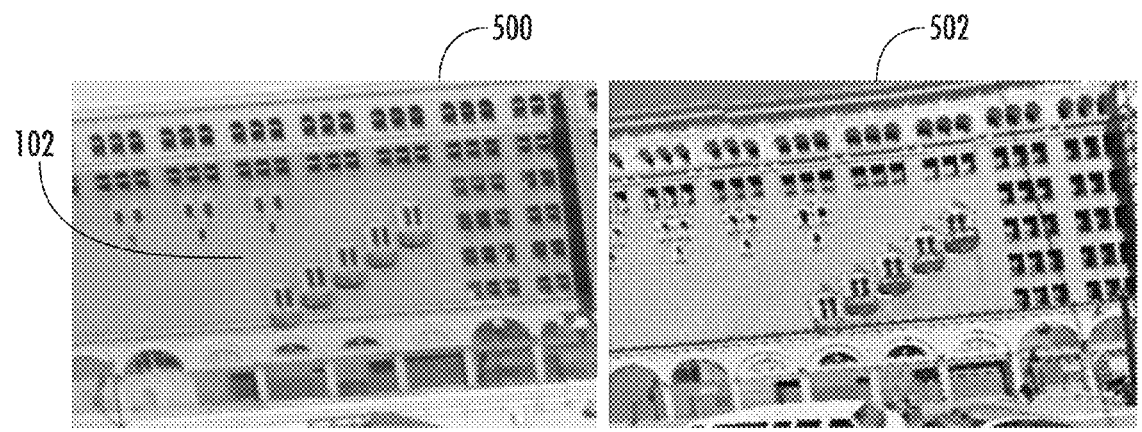
FIG. 7 depicts an example aerial image of a facade and a warped image of the same facade according to example embodiments of the present disclosure.

FIG. 7 depicts an aerial image 500 of facade 102. FIG. 7 further depicts a warped image 502. Warped image 502 is created by utilizing the pose of aerial image 500, the pose of panoramic image 300, and the position of facade plane 302 to transform panoramic image 300 into warped image 502 having a perspective associated with aerial image 500. More particularly, panoramic image 300 is transformed into warped image 502 by projecting facade plane 302 of panoramic image 300 to an image plane associated with aerial image 500.

Although, as evidenced by FIG. 7, a warped image will have a view that closely matches an aerial image, further registration between the two images can be necessary. Accordingly, at (210), method (200) includes identifying feature matches between the warped image and the aerial image. Any suitable feature matching technique can be used to match corresponding features between the warped image and the aerial image, such as the feature matching technique depicted in FIG. 8.

Figure 8:
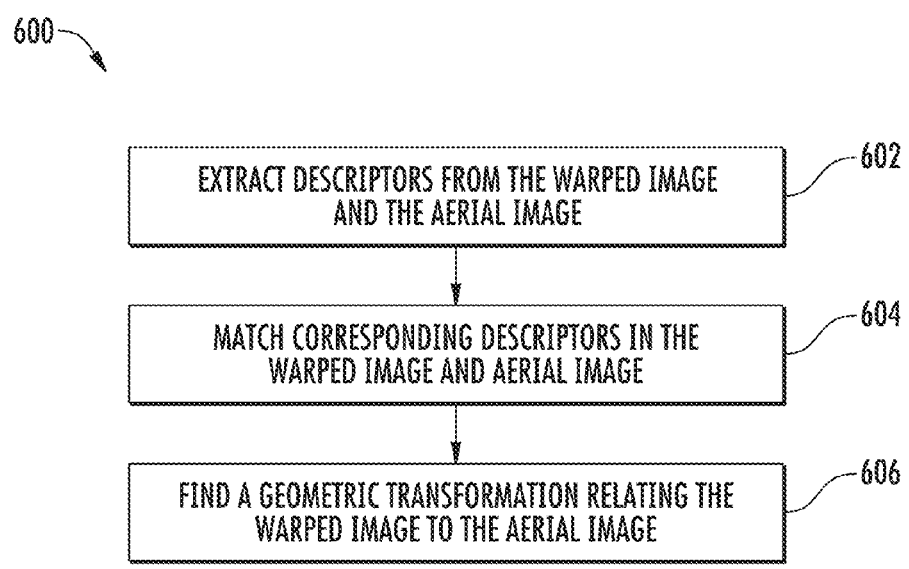
FIG. 8 depicts a flow diagram of an example method for matching features between a warped image and an aerial image according to example embodiments of the present disclosure.

FIG. 8 depicts a flow diagram of an example method (600) for matching features between a warped image and an aerial image according to an example embodiment of the present disclosure. At (602), method (600) can include extracting local image descriptors from a warped image and from an aerial image. The descriptors can be various points of interest in both the warped and aerial images. The descriptors can be identified using a scale invariant feature transform (SIFT) technique or other suitable technique, and the features can be matched based on appearance or based on feature similarity.

In a particular implementation, pixels associated with vegetation can be excluded from extraction. This can be done, for instance, by using LIDAR data or other geometric data to detect pixels associated with vegetation, and excluding these pixels from extraction in the warped and aerial images. In another particular embodiment, descriptors that are not located on the facade depicted in the warped and aerial image can be excluded from extraction.

At (604), method (600) can include matching corresponding descriptors in the warped and aerial images. For instance, for each descriptor in the warped image the most similar descriptor in the aerial image can be identified. In a particular implementation, a descriptor in a warped image can be matched to a descriptor in an aerial image if their locations are within 40 pixels of each other. The features can be matched, for instance, based on appearance or based on feature similarity.

Although extracted descriptors between the warped image and aerial image can be robustly matched, problems can still arise. For instance, a descriptor on a repeated facade element (e.g. a window) can match equally well to any copy of that element in the other image. In light of this problem, feature matching accuracy can be enhanced by keeping the top several descriptors and using these descriptors as match candidates.

At (606), method (600) can include finding a geometric transformation relating the warped image to the aerial image. The geometric transformation can be, for instance, a 2D transformation that aligns the most amount of matches found in (604). In a particular embodiment, the geometric transformation can be found using Random Sample Consensus (RANSAC). RANSAC is an outlier detection technique that creates many random subsets of the matches from (604). The subsets are then used to hypothesize a geometric transformation relating the images. The hypothesis that is consistent with the most other matches is chosen.

In an alternative embodiment, a transformation can be found by using multiple adjacent panoramic images. If, for instance, there is only a small number of matches in one image, finding a transformation by using multiple adjacent panoramic images can improve the accuracy of the transformation. For instance, a residential facade can often be smaller and less planar than an urban facade, which can lead to fewer feature matches. This problem can be compensated for by identifying a consistent transformation across multiple adjacent panoramic images as opposed to a single panoramic image.

Additionally, for facades that have 3D elements, such as bay windows or columns, there may not be a single transformation that correctly matches features between a warped image and an aerial image. In this instance, the non-planar areas can be modeled using, for instance, LIDAR data. In an alternative embodiment, matches in non-planar areas can be rejected.

The type of geometric transformation found at (606) can vary depending on the degree of misregistration between the warped image and the aerial image. For instance, if the two images are registered closely, the geometric transformation can be a simple translation between the two images. Similarly, the geometric transformation between the two images can be a rotation and/or a scaling. However, if the warped image and the aerial image are misregistered to a higher degree, the geometric transformation might be a complex homography.

Figure 9A:
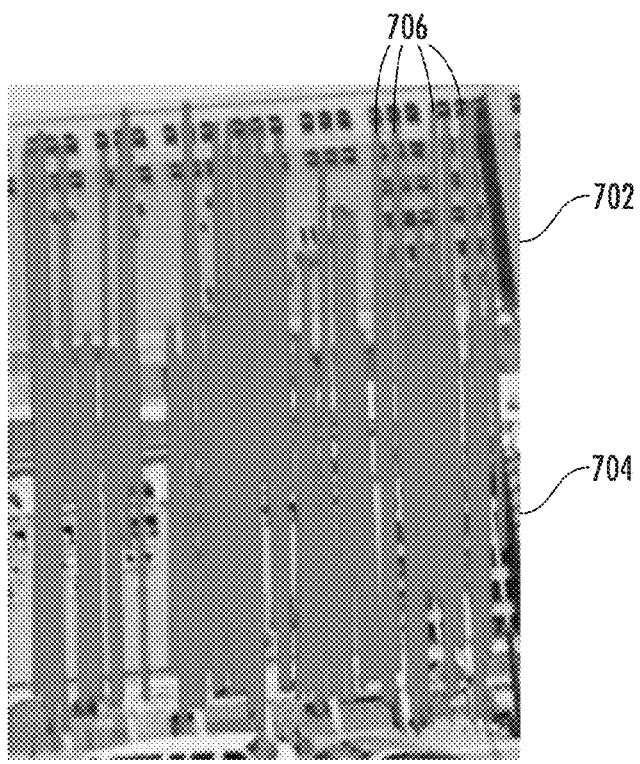
FIG. 9A depicts example feature matches between a warped image and an aerial image according to example embodiments of the present disclosure.
Figure 9B:
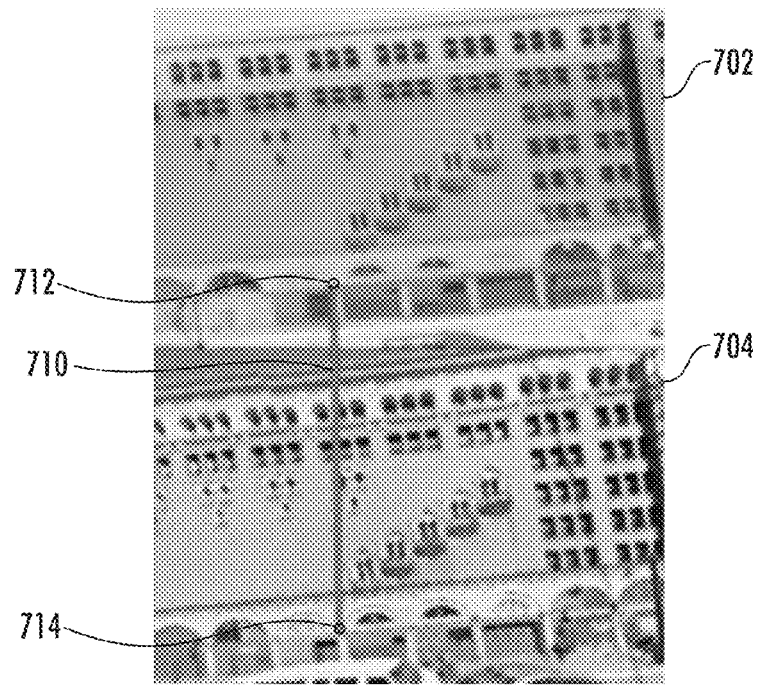
FIG. 9B depicts an example individual feature match between a warped image and an aerial image according to example embodiments of the present disclosure.

FIG. 9A depicts matched features between an example aerial image 702 and an example warped image 704 according to an example embodiment of the present disclosure. The matched features are demonstrated by vertical lines 706, each spanning from an individual descriptor in the aerial image to a corresponding descriptor in the warped image. The descriptors represent visual interest points in both the aerial and warped images. FIG. 9B also depicts aerial image 702 and warped image 704. FIG. 9B depicts only a single matched feature between the warped and aerial images. As shown by vertical line 710, descriptor 712 in the aerial image is matched with descriptor 714 in the warped image.

Referring back to FIG. 4 at (212), method (200) can include aligning the panoramic image to the aerial image. In a particular implementation, the alignment can be performed by creating constraints that relate three-dimensional facade points and their 2D locations in the panoramic image. A three-dimensional facade point can be found by back projecting the facade point in the aerial image to the facade plane. The corresponding panoramic image point can be found by transforming that panoramic image point using the geometric transformation as described with regard to (210).

In another particular implementation, the alignment of the panoramic image to the aerial image can be performed by creating constraints that relate 2D locations in the panoramic image and the aerial image. In this particular implementation, the three-dimensional facade point is not needed. The constraint is created by transforming the facade point in the aerial image into the panoramic image using the geometric transformation as described with regard to (210).

The constraints can be used to refine the pose of the panoramic image. For instance, a bundle adjustment algorithm can be implemented to adjust the pose of the panoramic image and to georeference objects depicted in the panoramic image based at least in part on the created constraints between the panoramic image and the aerial image.

Example Systems for Aligning Panoramic Imagery and Aerial Imagery

Figure 10:
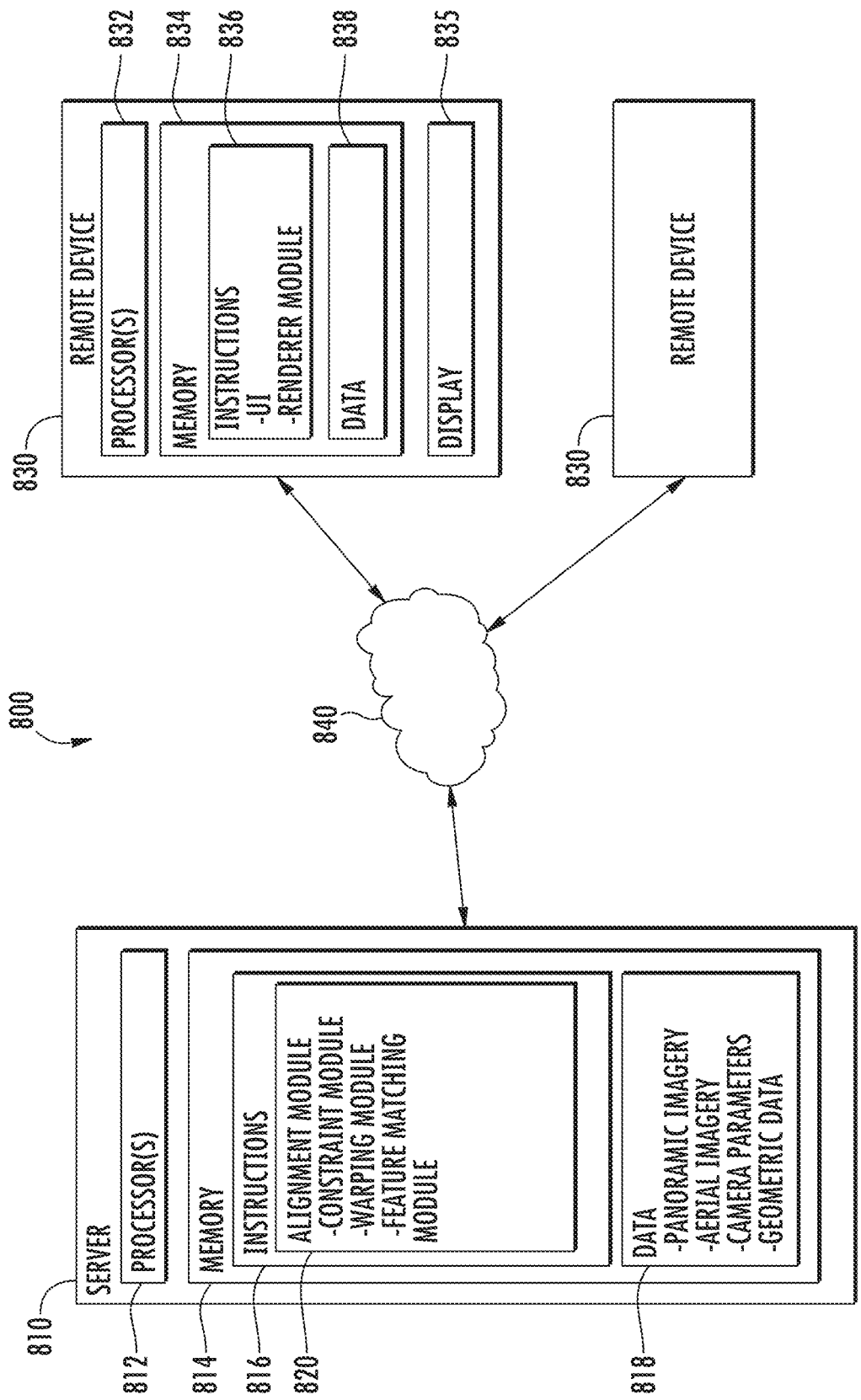
FIG. 10 depicts an example computing system that can be used to implement the methods and systems according to example embodiments of the present disclosure.

FIG. 10 depicts an example computing system 800 that can be used to implement the methods and systems according to example aspects of the present disclosure. The system 800 can be implemented using a client-server architecture that includes a server 810 that communicates with one or more client devices 830 over a network 840. The system 800 can be implemented using other suitable architectures, such as a single computing device.

The system 800 includes a server 810, such as a web server. The server 810 can host a geographic information system. The server 810 can be implemented using any suitable computing device(s). The server 810 can have one or more processors 812 and memory 814. The server 810 can also include a network interface used to communicate with one or more client devices 830 over network 840. The network interface can include any suitable components for interfacing with one or more networks, including for example, transmitters, receivers, ports, controllers, antennas, or other suitable components.

The one or more processors 812 can include any suitable processing device, such as a microprocessor, microcontroller, integrated circuit, logic device, or other suitable processing device. The memory 814 can include any one or more computer-readable media, including, but not limited to, non-transitory computer-readable media, RAM, ROM, hard drives, flash drives, or other memory devices. The memory 814 can store information accessible by the one or more processors 812, including computer-readable instructions 816 that can be executed by the one or more processors 812. The instructions 816 can be any set of instructions that when executed by the one or more processors 812, cause the one or more processors 812 to perform operations. For instance, the instructions 816 can be executed by the one or more processors 812 to implement one or more modules configured to implement an alignment module 820 and/or various aspects of any of the methods disclosed herein.

The alignment module 820 can be configured to align panoramic imagery captured from a perspective at or near ground level and aerial imagery according to example embodiments of the present disclosure. The alignment module 820 can include one or more modules, such as constraint module, warping module, and a feature matching module. The constraint module can be configured to create constraints that relate points in the panoramic and aerial images, such as that described with regard to (212) of method (200) depicted in FIG. 4. The warping module can be configured to transform a panoramic image to a warped image having a projection associated with an aerial image, such as in method (400) depicted in FIG. 6. The feature matching module can be configured to identify one or more matched features between the warped image and the aerial image, such as in method (600) depicted in FIG. 5. The alignment module 820 can be configured to align the panoramic imagery and the aerial imagery based at least in part on the matched features.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or, optical or magnetic media. When software is used, any suitable programming language or platform can be used to implement the module.

Memory 814 can also include data 818 that can be retrieved, manipulated, created, or stored by the one or more processors 812. The data 818 can include, for instance, panoramic imagery, aerial imagery, camera parameters, geometric data associated with both the panoramic and aerial imagery, and other information. The data 818 can be stored in one or more databases. The one or more databases can be connected to the server 810 by a high bandwidth LAN or WAN, or can also be connected to server 810 through network 840. The one or more databases can be split up so that they are located in multiple locales.

The server 810 can exchange data with one or more client devices 830 over the network 840. Although two client devices 830 are illustrated in FIG. 10, any number of client devices 830 can be connected to the server 810 over the network 840. Each of the client devices 830 can be any suitable type of computing device, such as a general purpose computer, special purpose computer, laptop, desktop, mobile device, smartphone, tablet, wearable computing device, a display with one or more processors, or other suitable computing device.

Similar to the server 810, a client device 830 can include one or more processor(s) 832 and a memory 834. The one or more processor(s) 832 can include one or more central processing units (CPUs), graphics processing units (GPUs) dedicated to efficiently rendering images, an/or other processing devices. The memory 834 can include one or more computer-readable media and can store information accessible by the one or more processors 832, including instructions 836 that can be executed by the one or more processors 832 and data 838. For instance, the memory 834 can store instructions 836 for implementing a user interface module and a renderer module for presenting interactive imagery of a geographic area to a user. The interactive imagery can be generated based at least in part on panoramic imagery aligned with aerial imagery.

The client device 830 of FIG. 10 can include various input/output devices for providing information to and receiving information from a user, such as a touch screen, touch pad, data entry keys, speakers, and/or a microphone suitable for voice recognition. For instance, the client device 830 can have a display 835 for presenting geographic imagery of a geographic area to a user.

The client device 830 can also include a network interface used to communicate with one or more remote computing devices (e.g. server 810) over the network 840. The network interface can include any suitable components for interfacing with one or more networks, including for example, transmitters, receivers, ports, controllers, antennas, or other suitable components.

The network can be any type of communication network, such as local area network (e.g. intranet), wide area network (e.g. Internet), cellular network, or some combination thereof. The network 840 can also include a direct connection between a client device 830 and the server 810. In general, communication between the server 810 and a client device 830 can be carried via network interface using any type of wired and/or wireless connection, using a variety of communication protocols (e.g. TCP/ICP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of aligning panoramic imagery to aerial imagery, the method comprising:
  accessing, by one or more computing devices, a panoramic image captured from a perspective at or near ground level, the panoramic image associated with a first pose and first geometric data;
  detecting, by the one or more computing devices, a facade plane in the panoramic image based at least in part on the first geometric data, the facade plane being detected by identifying one or more vertical planar polygons corresponding to a building facade depicted in the panoramic image;
  identifying, by the one or more computing devices, an aerial image, based at least in part on a view of the detected facade plane depicted in the aerial image, the aerial image associated with a second pose and second geometric data, wherein the aerial image is identified based at least in part on an occlusion or a foreshortening of the view of the detected facade plane in the aerial image;
  transforming, by the one or more computing devices, the panoramic image to a warped image by projecting an image plane of the panoramic image to an image plane associated with the aerial image based at least in part on the first geometric data;
  identifying, by the one or more computing devices, one or more feature matches between the warped image and the aerial image; and
  aligning, by the one or more computing devices, the panoramic image to the aerial image, based at least in part on the one or more feature matches.

2. The computer-implemented method of claim 1, wherein the first geometric data provides a three-dimensional geometry of the geographic area depicted in the panoramic image.

3. The computer-implemented method of claim 2, wherein the three-dimensional geometry is determined based at least in part on data associated with a laser range finder.

4. The computer-implemented method of claim 1, wherein the second geometric data comprises a depth map, the depth map providing the distance to the closest object at each pixel of the aerial image.

5. The computer-implemented method of claim 1, wherein aligning, by the one or more computing devices, the panoramic image to the aerial image comprises creating constraints that relate three-dimensional facade points associated with the facade plane and their two-dimensional locations in the panoramic image.

6. The computer-implemented method of claim 1, wherein aligning, by the one or more computing devices, the panoramic image to the aerial image comprises creating, by the one or more computing devices, constraints that relate two-dimensional locations in the panoramic image and the aerial image.

7. The computer-implemented method of claim 1, wherein identifying, by the one or more computing devices, one or more feature matches comprises:
    extracting, by one or more computing devices, one or more descriptors of the warped image and the aerial image;
    matching, by the one or more computing devices, corresponding descriptors in the warped image and the aerial image; and
    determining, by the one or more computing devices, a geometric transformation relating the warped image and the aerial image based, at least in part, on the matched descriptors of the warped image and the aerial image.

8. The computer-implemented method of claim 7, wherein extracting, by the one or more computing devices, one or more descriptors comprises excluding from the descriptors, by the one or more computing devices, pixels in the warped image and the aerial image that are not associated with the facade plane.

9. The computer-implemented method of claim 1, wherein aligning, by the one or more computing devices, the panoramic image to the aerial image comprises adjusting, by the one or more computing devices, the first pose based at least in part on the one or more feature matches.

10. The computer-implemented method of claim 1, wherein transforming, by the one or more computing devices, the panoramic image into a warped image comprises:
    projecting, by the one or more computing devices, the detected facade plane into the aerial image;
    identifying, by the one or more computing devices, a bounding box of the facade plane relative to the aerial image;
    back projecting, by the one or more computing devices, each pixel in the bounding box onto a corresponding three-dimensional point on the facade plane; and
    reprojecting, by the one or more computing devices, each point on the facade plane into the panoramic image.

11. The computer-implemented method of claim 1, further comprising updating, by the one or more computing devices, a three-dimensional model of a geographic area based at least in part on alignment of the panoramic image to the aerial image.

12. The computer-implemented method of claim 11, further comprising receiving, by the one or more computing devices, a request from a user for the three-dimensional model and providing, by one or more computing devices, the three-dimensional model to the user responsive to the request.

13. A computing system, comprising:
    one or more processors; and
    one or more computer-readable media storing computer-readable instructions that when executed by the one or more processors cause the one or more processors to perform operations, the operations comprising:
        accessing a panoramic image captured from a perspective at or near ground level, the panoramic image associated with a first pose and first geometric data;
        detecting a facade plane in the panoramic image based at least in part on the first geometric data, the facade plane being detected by identifying one or more vertical planar polygons corresponding to a building facade depicted in the panoramic image;
        identifying an aerial image based at least in part on the detected facade plane, the aerial image associated with a second pose and second geometric data, the aerial image being identified based at least in part on an occlusion or a foreshortening associated with a view of the facade plane in the aerial image;
        transforming the panoramic image to a warped image by projecting an image plane of the panoramic image to an image plane associated with the aerial image based at least in part on the first geometric data;
        identifying one or more feature matches between the warped image and the aerial image;
        aligning the panoramic image to the aerial image, based at least in part on the one or more feature matches.

14. The computing system of claim 13, wherein aligning the panoramic image to the aerial image comprises adjusting the first pose based at least in part on the one or more feature matches.

15. The computing system of claim 13, wherein the operation of identifying feature matches comprises:
    extracting one or more descriptors of the warped image and the aerial image;
    matching corresponding descriptors in the warped image and the aerial image; and
    finding a geometric transformation relating the warped image and the aerial image based at least in part on the matched descriptors of the warped image and the aerial image.

16. One or more non-transitory computer-readable media storing computer-readable instructions that when executed by one or more processors cause the one or more processors to perform operations, the operations comprising:
    accessing a panoramic image captured from a perspective at or near ground level, the panoramic image associated with a first pose and first geometric data;
    detecting a facade plane in the panoramic image based at least in part on the first geometric data, the facade plane being detected by identifying one or more vertical planar polygons corresponding to a building facade depicted in the panoramic image;
    identifying an aerial image based at least in part on the detected facade plane, the aerial image associated with a second pose and second geometric data, the aerial image being identified based at least in part on an occlusion and a foreshortening of a view of the facade plane in the aerial image;
    transforming the panoramic image to a warped image by projecting an image plane of the panoramic image to an image plane associated with the aerial image based at least in part on the first geometric data;

identifying one or more feature matches between the warped image and the aerial image;

aligning the panoramic image to the aerial image, based at least in part on the one or more feature matches.

17. The one or more non-transitory computer-readable media of claim 16, wherein the operation of aligning the panoramic image to the aerial image comprises adjusting the first pose based at least in part on the one or more feature matches.

\* \* \* \* \*